United States Patent
Pesch et al.

(10) Patent No.: US 6,397,987 B1
(45) Date of Patent: Jun. 4, 2002

(54) DASHPOT PISTON IN HALVES

(75) Inventors: Christoph Pesch, St. Augustin; Helmut Drees, Ennepetal, both of (DE)

(73) Assignee: Krupp Bilstein GmbH, Ennepetal (DE)

( * ) Notice: Subject to any disclaimer, the term of this patent is extended or adjusted under 35 U.S.C. 154(b) by 0 days.

(21) Appl. No.: 09/809,971

(22) Filed: Mar. 16, 2001

(30) Foreign Application Priority Data

Mar. 18, 2000 (DE) .......................................... 100 13 638

(51) Int. Cl.$^7$ .................................................. F16F 9/00
(52) U.S. Cl. ........................... 188/322.22; 188/322.15; 188/322.18; 277/461; 277/496; 92/188
(58) Field of Search ..................... 188/322.15, 322.22, 188/312, 317, 280, 282.1, 322.18; 92/188, 212; 277/459, 460, 461, 463, 464, 465, 496, 498

(56) References Cited

U.S. PATENT DOCUMENTS

| | | | | |
|---|---|---|---|---|
| 3,814,445 A | * | 6/1974 | Bitzan | ......................... 277/165 |
| 4,592,559 A | * | 6/1986 | Harvey | ......................... 277/214 |
| 4,830,152 A | * | 5/1989 | Rauert et al. | .......... 188/322.15 |
| 6,176,492 B1 | * | 1/2001 | Sawai | ......................... 277/461 |

* cited by examiner

*Primary Examiner*—Pam Rodriguez
(74) *Attorney, Agent, or Firm*—Max Fogiel

(57) ABSTRACT

A dashpot piston in halves, the face of each resting against that of the other. The piston can be fastened to the end of a piston rod either directly or by way of a connector. Each half (1 & 2) is provided with a depression (7) along the circumference remote from the face of the other, creating a continuous groove (8) with a shorter diameter and accommodating a piston-assembly ring (9). Manufacture is facilitated by the inclusion of at least one resilient supporting ring (11) between the piston-assembly ring and the base of the groove.

11 Claims, 2 Drawing Sheets

DASHPOT PISTON IN HALVES

BACKGROUND OF THE INVENTION

The present invention concerns a dashpot piston in halves, the face of each resting against that of the other.

Dashpot pistons of this genus are almost always of a sintered material and comply with the specifications for wear and handling demanded of pistons employed in wheel suspensions for automobiles.

A dashpot piston of the genus recited in the preamble to Claim 1 is known from German 3701557 A1. This piston can be fastened to the end of a piston rod either directly or by way of a connector. Each half is provided with a depression along the circumference remote from the face of the other, creating a continuous groove. The groove accommodates a piston-assembly ring. One drawback, especially to sintered or pressed dashpot pistons, are problems associated with tolerances in the diameter in particular of the depressions that will eventually constitute the groove. Wear on the sintered or pressed blank in particular will cause variations in the diameter in accordance with how long the tool has been in use. Since this tolerance could affect the outside effective diameter of the dashpot piston by way of the piston-assembly ring eventually accommodated in the groove, resulting in excess play or tightness in relation to the dashpot's cylinder, the base of the groove must be machined to ensure the necessary tolerance.

SUMMARY OF THE INVENTION

The object of the present invention is to simplify the manufacture of the generic dashpot piston and compensate any tolerances in the piston's outside effective diameter.

The present invention has several advantages. The piston can for instance be manufactured directly by sintering and pressing or by other procedures that do not involve machining during or after manufacture. Furthermore, a dashpot piston in accordance with the present invention will hold together once the halves have been joined with no need for further measures.

BRIEF DESCRIPTION OF THE DRAWINGS

One embodiment of the present invention will now be specified with reference to the accompanying drawing, wherein.

DESCRIPTION OF THE PREFERRED EMBODIMENTS

Figure 1:
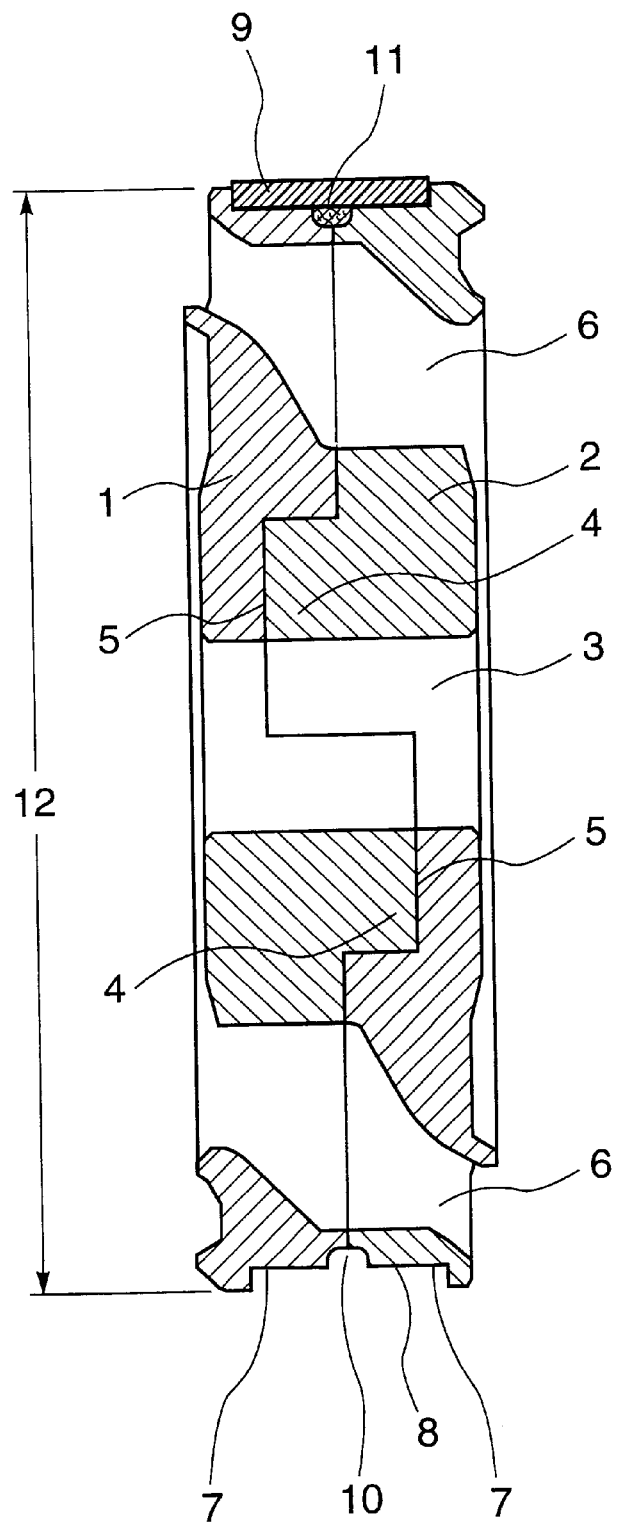
FIG. 1 is a section through a dashpot piston with a supporting ring at the middle and FIG. 2 is a section through a similar piston employing two supporting rings.
Figure 2:
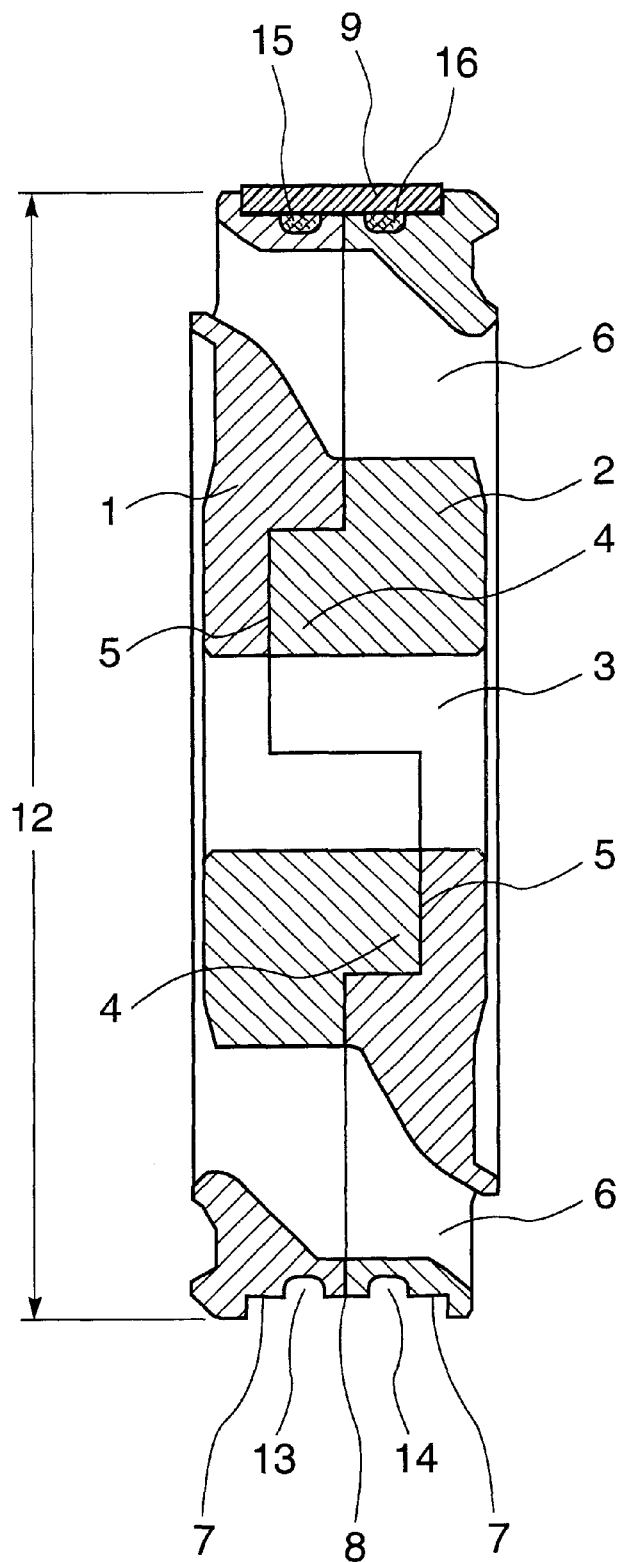

The dashpot piston illustrated in FIGS. 1 and 2 is composed of two identical halves 1 and 2. Piston halves 1 and 2 are provided with a central bore 3, which the end of an unillustrated piston rod is thrust through. Both halves are provided at the center with elevations 4 that fit into depressions 5. Halves 1 and 2 accordingly rest against each other rotated at an angle ensuring that the various-width sections of fluid-conveying channels 6 will be aligned in the desired sequence. Unillustrated cup springs alternatingly block fluid-conveying channels 6, attaining the desired suppression of impact in both the compression and decompression directions.

Halves 1 and 2 are circumferentially provided with a depression 7 toward the mutually contacting faces. Depressions 7 constitute a groove 8 in the assembled halves 1 and 2. Groove 8 accommodates a piston-assembly ring 9, intact in the illustrated example and of an appropriate plastic.

The inside diameter of piston-assembly ring 9 is slightly longer than that of the base of groove 8.

FIG. 1 illustrates another groove, groove 10, in the vicinity of the interface between halves 1 and 2. Groove 10 extends about halfway over both halves 1 and 2 and accommodates a supporting ring 11 in the form of an O ring of resilient material. The dashpot is assembled by forcing supporting ring 11 over half the groove in piston half 1 and piston-assembly ring 9 over piston half 2. This approach, in conjunction with the air intentionally left between groove 8 and piston-assembly ring 9 ensures the requisite compensation in tolerance. The tolerance in the piston's effective diameter 12 accordingly depends only on the outside dimension of piston-assembly ring 9. An axial discontinuity in piston-assembly ring 9 will also compensate for wear on the ring's outer circumference, the pressure exerted by supporting ring 11 matching it to the inside diameter of the dashpot's cylinder. A piston-assembly ring 9 with such a discontinuity will also allow compensation of the tolerances at the cylinder's inside diameter.

The dashpot piston illustrated in FIG. 2 differs slightly from that illustrated in FIG. 1. The depression 7 in each piston half 1 and 2 is provided with a groove 13 and 14 respectively. One supporting ring 15 is accommodated in groove 13 and another supporting ring 16 in groove 14. Piston half 2 is forced in once piston-assembly ring 9 has been forced over piston half 1. A combination of the grooves and supporting rings illustrated in FIGS. 1 and 2 is also possible, employing for example three grooves and three supporting rings. A flat supporting ring could also be accommodated in an oblong groove. The piston-assembly ring 9 may be discontinuous, and the discontinuities between segments may be sealed by adhesive, solder, or welding.

What is claimed is:

1. A dashpot piston comprising two piston halves, each half having a face resting against the face of the other half; a piston rod having an end fastenable to said piston; a piston-assembly ring, each of said halves having a depression along a circumference remote from the face of the other half to form a continuous groove with a diameter shorter than an outer diameter of said piston for accommodating said piston-assembly ring; at least one resilient supporting ring between said piston-assembly ring and the base of the groove, said halves of said piston lying against each other along a parting plane with an additional groove in said plane and extending along both said halves so that said halves are held together after assembly of individual parts without further means before fastening to said end of said piston rod.

2. A piston as defined in claim 1, wherein said at least one supporting ring is an O ring.

3. A piston as defined in claim 1, wherein said at least one supporting ring is accommodated in and extends beyond at least one said additional groove.

4. A piston as defined in claim 3, wherein said halves are mutually contacting halves, said at least one additional groove being accommodated at an interface between and extending over said mutually contacting halves.

5. A piston as defined in claim 1, wherein said piston-assembly ring is continuous.

6. A piston as defined in claim 1, wherein said piston-assembly ring comprises segments spaced from each other to form discontinuities between said segments, said discontinuities being sealed.

7. A piston as defined in claim 6, wherein said discontinuities are sealed by adhesive.

8. A piston as defined in claim 6, wherein said discontinuities are sealed by solder.

9. A piston as defined in claim 6, wherein said discontinuities are sealed by welding.

10. A piston as defined in claim 1, including connector means between said piston and said end of said piston rod.

11. A dashpot piston comprising two piston halves, each half having a face resting against the face of the other half; a piston rod having an end fastenable to said piston; a piston-assembly ring, each of said halves having a depression along a circumference remote from the face of the other half to form a continuous groove with a diameter shorter than an outer diameter of said piston for accommodating said piston-assembly ring; at least one resilient supporting ring between said piston-assembly ring and the base of the groove, said halves of said piston lying against each other along a parting plane with an additional groove in said plane and extending along both said halves so that said halves are held together after assembly of individual parts without further means before fastening to said end of said piston rod; said at least one supporting ring being an O ring; said at least one supporting ring being accommodated in and extending beyond said at least one additional groove; said halves being mutually contacting halves, said at least one additional groove being accommodated at an interface between and extending over said mutually contacting halves; said piston-assembly ring comprising segments spaced from each other to form discontinuities between said segments, said discontinuities being sealed; and connector means between said piston and said end of said piston rod, said discontinuities being sealed by adhesive.

* * * * *